US012775896B2

(12) United States Patent
Galow et al.

(10) Patent No.: US 12,775,896 B2
(45) Date of Patent: Oct. 27, 2026

(54) SYSTEMS AND METHODS FOR RISK FACTOR PREDICTIVE MODELING WITH DOCUMENT SUMMARIZATION

(71) Applicant: BANK OF MONTREAL, Toronto (CA)

(72) Inventors: Drew R. Galow, Toronto (CA); Meera Das, Toronto (CA)

(73) Assignee: BANK OF MONTREAL, Toronto (CA)

( * ) Notice: Subject to any disclaimer, the term of this patent is extended or adjusted under 35 U.S.C. 154(b) by 234 days.

(21) Appl. No.: 18/809,152

(22) Filed: Aug. 19, 2024

(65) Prior Publication Data

US 2024/0412143 A1 Dec. 12, 2024

Related U.S. Application Data

(63) Continuation of application No. 17/943,909, filed on Sep. 13, 2022, now Pat. No. 12,159,252.

(51) Int. Cl.
*G06Q 10/0635* (2023.01)
*G06F 16/34* (2025.01)
(Continued)

(52) U.S. Cl.
CPC ....... *G06Q 10/0635* (2013.01); *G06F 16/345* (2019.01); *G06F 40/295* (2020.01); *G06F 40/40* (2020.01)

(58) Field of Classification Search
CPC .. G06Q 10/0635; G06Q 10/00; G06F 16/345; G06F 40/295; G06F 40/40; G06F 40/284;
(Continued)

(56) References Cited

U.S. PATENT DOCUMENTS 7,607,083 B2 10/2009 Gong et al.
9,020,808 B2 4/2015 Branton
(Continued)

FOREIGN PATENT DOCUMENTS

CN 106776544 A 5/2017
CN 110322870 A 10/2019

OTHER PUBLICATIONS

"AI Is at the Forefront of Reducing Money Laundering and Combating the Financing of Terrorism" (Executive Summary); www.sas.com; 8 pages.

(Continued)

*Primary Examiner* — Yogeshkumar Patel
(74) *Attorney, Agent, or Firm* — Foley & Lardner LLP

(57) ABSTRACT

A system and method for document summarization generates summarized articles and risk factor categorizations for display at a graphical user interface (GUI) dashboard. A transaction monitoring system includes an adverse media dashboard pipeline for processing risk factor alerts and generating document summarizations for display at a user device. Document summarization extracts several sentences from a source text and stacks the sentences to create a summary. The method creates a vector representation of each sentence using a machine learning word embedding model and generates a sentence similarity matrix by computing cosine similarity values. A sentence graph creation algorithm creates a graph corresponding to the sentence similarity matrix and calculates importance scores used in selecting sentences for the document summary. The GUI dashboard includes first, second, third and fourth dashboard regions for displaying alert report records, media records, and graphical user interface layouts of document summaries and risk factor visualizations.

20 Claims, 8 Drawing Sheets

(51) Int. Cl.
*G06F 40/295* (2020.01)
*G06F 40/40* (2020.01)

(58) Field of Classification Search
CPC ...... G06F 40/30; G06F 16/215; G06F 16/164; G06F 40/20; G06N 20/00
See application file for complete search history.

(56) References Cited

U.S. PATENT DOCUMENTS

| | | | | |
|---|---|---|---|---|
| 2014/0096249 | A1* | 4/2014 | Dupont | G06F 21/00 726/23 |
| 2014/0229159 | A1 | 8/2014 | Branton | |
| 2017/0235848 | A1* | 8/2017 | Van Dusen | G06F 16/90335 705/12 |
| 2019/0325528 | A1 | 10/2019 | Adjaoute | |
| 2019/0354544 | A1 | 11/2019 | Hertz et al. | |
| 2021/0216928 | A1* | 7/2021 | O'Toole | G06F 16/29 |
| 2021/0294974 | A1* | 9/2021 | Gao | G06F 3/0481 |
| 2021/0357378 | A1* | 11/2021 | Urdiales | G06F 16/2237 |
| 2022/0206993 | A1* | 6/2022 | Layton | G06F 16/164 |
| 2022/0222703 | A1* | 7/2022 | Lagi | G06F 16/9535 |

OTHER PUBLICATIONS

Aliguliyev, Ramiz M., "A new sentence similarity measure and sentence based extractive technique for automatic text summarization"; Expert Systems with Applications, vol. 36, Issue 4 (pp. 7764-7772), May 2009, 9 pages.

Gambhir, Mahak, et al., "Recent automatic text summarization techniques: a survey"; Artificial Intelligence Review, vol. 47, Issue 1; Jan. 2017; 66 pages.

Mihalcea, Rada, et al., TextRank: Bringing Order into Texts; Proceedings of the 2004 Conference on Empirical Methods in Natural Language Processing; Jul. 2004; 8 pages.

Notice of Allowance on U.S. Appl. No. 17/943,909 DTD Jul. 26, 2024 (8 pages).

Wan, Xiaojun, "Using only cross-document relationships for both generic and topic-focused multi-document summarizations"; Information Retrieval vol. 11, pp. 25-49 (Nov. 8, 2007); 25 pages.

Wan, Xiaojun, et al., "Manifold-Ranking Based Topic-Focused Multi-Document Summarization"; Proceedings of the 20th international joint conference on Artifical intelligence (pp. 2903-2908), Jan. 2007, 6 pages.

Wang, Dingding, et al., "Multi-Document Summarization via Sentence-Level Semantic Analysis and Symmetric Matrix Factorization"; Proceedings of the 31st annual international Acm Sigir conference on Research and development in information retrieval (pp. 307-331), Jul. 2008, 8 pages.

Yang, Kang, et al., "An Integrated Graph Model for Document Summarization;" Information 2018, 9(9), 232; https://doi.org/10.3390/info9090232; Sep. 13, 2018; 13 pages.

Zhou et al. "[Retracted] TextRank Keyword Extraction Algorithm Using Word Vector Clustering Based on Rough Data-Deduction", Computational Intelligence and Neuroscience—Wiley Online Library, Jan. 25, 2022 https://onlinelibrary.wiley.com/doi/10.1155/2022/5649994 (Year: 2022).

* cited by examiner

SYSTEMS AND METHODS FOR RISK FACTOR PREDICTIVE MODELING WITH DOCUMENT SUMMARIZATION

CROSS-REFERENCE TO RELATED APPLICATIONS

This application is a continuation application of U.S. application Ser. No. 17/943,909, filed Sep. 13, 2022, which is incorporated by reference herein in its entirety for all purposes.

TECHNICAL FIELD

This application relates generally to predictive modeling, and to techniques for retrieving, structuring and displaying data.

BACKGROUND

With a large volume of documents, presenting a user with a summary of each document and a hint on the topic of the document can greatly facilitate the task of finding desired information. Document summarization can play an important role in information retrieval and analysis. Document summarization is a process of automatically creating a compressed version of a given document that provides useful information to users. The main goal of a summary is to present the main ideas in a document in less space. Generally speaking, document summaries can be either generic or topic-focused.

One field of application of information retrieval and analysis is risk management. Enterprise risk management programs typically seek to identify and monitor risk factors that could increase the risk of money laundering, and to take actions to mitigate risk. Information retrieval and analysis tools, including artificial intelligence ("AI") based tools such as document summarization, can aid users in risk management activities such as investigations related to potentially suspicious customer transactions. However, conventional AI-based risk management tools have limitations in aiding investigators in finding desired information and in assessing the reliability of such information. Conventional tools also have limitations in presenting risk factor information in an effective format to facilitate analysis and to inform risk-mitigation activities.

SUMMARY

What is needed are systems and methods that provide improved information retrieval and analysis for assessing and managing risk factors. Also needed are systems and methods that increase productivity of investigations in reliably monitoring and assessing risk factors related to money laundering. Also needed are systems and methods that facilitate risk mitigation actions such as escalation of investigations of compliance risks, and due diligence of risk factors in enterprise transactions. A further need is improved detection quality for risk factor investigations to analyze transaction patterns or to uncover hidden risks. An additional need is a tool for aiding users in detecting and identifying risk factors pertaining to criminal activities from documents. The embodiments described herein utilize an extractive document summarization model to increase productivity of investigations, and employ machine learning predictive modeling to improve accuracy of topic-based summarization. The embodiments described herein utilize graphical user interface displays of document summaries and of predicted topics related to pre-defined risk factor visualizations to aid users in detecting and identifying risk factors.

In various embodiments, a document summarization methodology generates summarized articles and risk factor categorization data for display at an adverse media dashboard. In an embodiment, the document summarization methodology is implemented in an adverse media dashboard pipeline for processing risk factor alerts, and for generating document summarizations for display at the adverse media dashboard.

In an embodiment, the adverse media dashboard categorizes adverse media items and other input texts into a set of selected categories such as risk factor topics including AML, financial crimes, terrorism, and legal/reputation.

In an embodiment, a method for automatic text summarization pre-processes an input text received from a data source using linguistic techniques for text cleaning such removal of stop-words and removal of punctuation marks. In addition, text summarization pre-processes the input text into sentences.

In various embodiments, following pre-processing of the text file, the document summarization method creates a vector representation of each sentence by applying a natural language processing machine learning model previously trained with a selected listing of subject matter topics. In an embodiment, the natural language processing machine learning model is a machine learning word embedding model. In an embodiment, the selected listing includes words and phrases pertaining to a plurality of risk factor topics of interest. The method then generates a sentence similarity matrix of the plurality of sentences containing a plurality of entries corresponding to pairs of respective sentences of the plurality of sentences. Each entry of the sentence similarity matrix is generated by computing cosine similarity values of vector representations of the corresponding pair of respective sentences.

In various embodiments, further steps of the documentation summarization method include creating a graph based upon the similarity matrix including a plurality of nodes corresponding to respective sentences and a plurality of undirected edges connecting pairs of nodes. In an embodiment, each of the undirected edges represents an entry of the sentence similarity matrix for the pair of respective sentences corresponding to the nodes connected by that edge. The method then calculates an importance score of each sentence of the plurality of sentences by applying weighted graph-based ranking to the graph based upon the sentence similarity matrix. The weighted graph-based ranking calculates an importance score for each node of the graph and its corresponding sentence.

In subsequent steps of document summarization, the method selects a subset of the plurality of sentences in the source text having highest importance scores and compiles the selected sentences in a predetermined order as they appear in the original text. The method outputs a text summary including the compiled selected sentences in the predetermined order for display by a graphical user interface of a user display device.

In certain embodiments, the document summarization method includes the additional step of categorizing the originally received text file into one of more of a set of selected risk factors topics. In an embodiment, the graphical user interface displays both the text summary and a graphical depiction of the set of selected risk factor topics.

In various embodiments, a server based system generates a graphical user interface dashboard for displaying alert report records from the transaction monitoring models, media records, and graphical user interface displays of document summaries and of risk factor visualizations. In various embodiments, the graphical user interface dashboard includes a first dashboard region, a second dashboard region, a third dashboard region, and a fourth dashboard region.

In various embodiments, the first dashboard region displays a listing of alert records derived from the output of the transaction monitoring models. The second dashboard region displays a set of links to respective media records of an alert record, generated in response to user selection of that alert record at the first dashboard region. The third dashboard region displays a plurality of graphical formatting elements for one or more of the media records, wherein the graphical formatting elements correspond to a set of selected risk factor topic categories. The fourth dashboard region displays a document summary of a text document included in one of the media records listed at the second dashboard region, generated in response to user selection of that media record via actuation of a link.

In an embodiment, a computer-implemented method comprises segmenting, by the computer, a text file into a plurality of sentences; creating, by the computer, a representation of each sentence of the plurality of sentences by applying a natural language processing machine learning model previously trained with a listing of words and phrases; generating, by the computer, a sentence similarity matrix of the plurality of sentences containing a plurality of entries corresponding to pairs of respective sentences of the plurality of sentences; creating, by the computer, a graph based upon the sentence matrix, the graph comprising a plurality of nodes corresponding to respective sentences of the plurality of sentences and a plurality of undirected edges connecting each pair of the plurality of nodes, wherein each of the undirected edges represents the entry of the sentence similarity matrix for the pair of respective sentences corresponding to the pair of the nodes connected by that edge; calculating, by the computer, an importance score of each sentence of the plurality of sentences by applying weighted graph-based ranking to the graph based upon the sentence matrix to calculate an importance score for each node of the graph and its corresponding sentence; selecting, by the computer, a subset of the plurality of sentences having highest importance scores, and compiling the subset of sentences in a predetermined order; and outputting, by the computer for display by a display device, a text summary comprising the compiled s sentences in the predetermined order.

In an embodiment, a computer system comprises a user device, and a computer in communication with the user device, wherein the computer is configured to: segment a text file into a plurality of sentences; create a representation of each sentence of the plurality of sentences by applying a natural language processing machine learning model previously trained with a listing of words and phrases including a plurality of risk factor topics; generate a sentence similarity matrix of the plurality of sentences containing a plurality of entries corresponding to pairs of respective sentences of the plurality of sentences; create a graph based upon the sentence matrix, the graph comprising a plurality of nodes corresponding to respective sentences of the plurality of sentences and a plurality of undirected edges connecting each pair of the plurality of nodes; calculate an importance score of each sentence of the plurality of sentences by applying weighted graph-based ranking to the graph based upon the sentence matrix to calculate an importance score for each node of the graph and its corresponding sentence; select a subset of the plurality of sentences having highest importance scores, and compile the selected sentences in a predetermined order; output a text summary comprised of the compiled selected sentences in the predetermined order; generate a graphical user interface displaying the text summary; and display the graphical user interface on the user device operated by a user.

In an embodiment, a computer-implemented method comprises retrieving, by a server, a plurality of alert report data files from an investigation alerts database including data for a plurality of investigation subjects, wherein respective alert report data files comprise media records matching respective alert queries, wherein each alert query identifies a particular investigation subject, wherein at least some of the media records include text documents; analyzing, by the server, the media records to generate respective document summary files and topic categorization files for the text documents included in the media records; and generating, by the server, a graphical user interface dashboard configured for display on a client computing device associated with a user, the graphical user interface dashboard comprising: a first dashboard region configured to display a listing of alert records extracted from at least some of the plurality of alert report data files; a second dashboard region configured to display, in response to selection of one of the alert records via input received from the client computing device, a set of links to respective media records of the alert report data file corresponding to the selected alert record; a third dashboard region configured to display, in response to display of the set of links to respective media records at the second dashboard region, a graphical depiction of one or more attributes of a set of selected topics included in the topic categorization files for one or more of the respective media records; and a fourth dashboard region configured to display, in response to actuation of one of the links to respective media records displayed at the second dashboard region, a document summary of a text document included in the respective media record corresponding to the actuated link.

In an embodiment, a system comprises a server configured to: retrieve a plurality of alert report data files from an investigation alerts database including data for a plurality of investigation subjects, wherein respective alert report data files comprise media records matching respective alert queries, wherein each alert query identifies a particular investigation subject, wherein at least some of the media records include text documents; analyze the media records to generate respective document summary files and topic categorization files for the text documents included in the media records; and generate a graphical user interface dashboard configured for display on a client computing device associated with a user, the graphical user interface dashboard comprising: a first dashboard region configured to display a listing of alert records extracted from at least some of the plurality of alert report data files retrieved from an investigation alerts database; a second dashboard region configured to display, in response to selection of one of the alert records via input received from the client computing device, a set of links to respective media records of the alert report data file corresponding to the selected alert record; a third dashboard region configured to display, in response to display of the set of links to respective media records at the second dashboard region, a graphical depiction of one or more attributes of a set of selected topics included in the topic categorization files for one or more of the respective media records; and a fourth dashboard region including a window configured to display, in response to actuation of one of the links to respective media records displayed at the second dashboard region, a document summary of a text document included in the respective media record corresponding to the actuated link.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
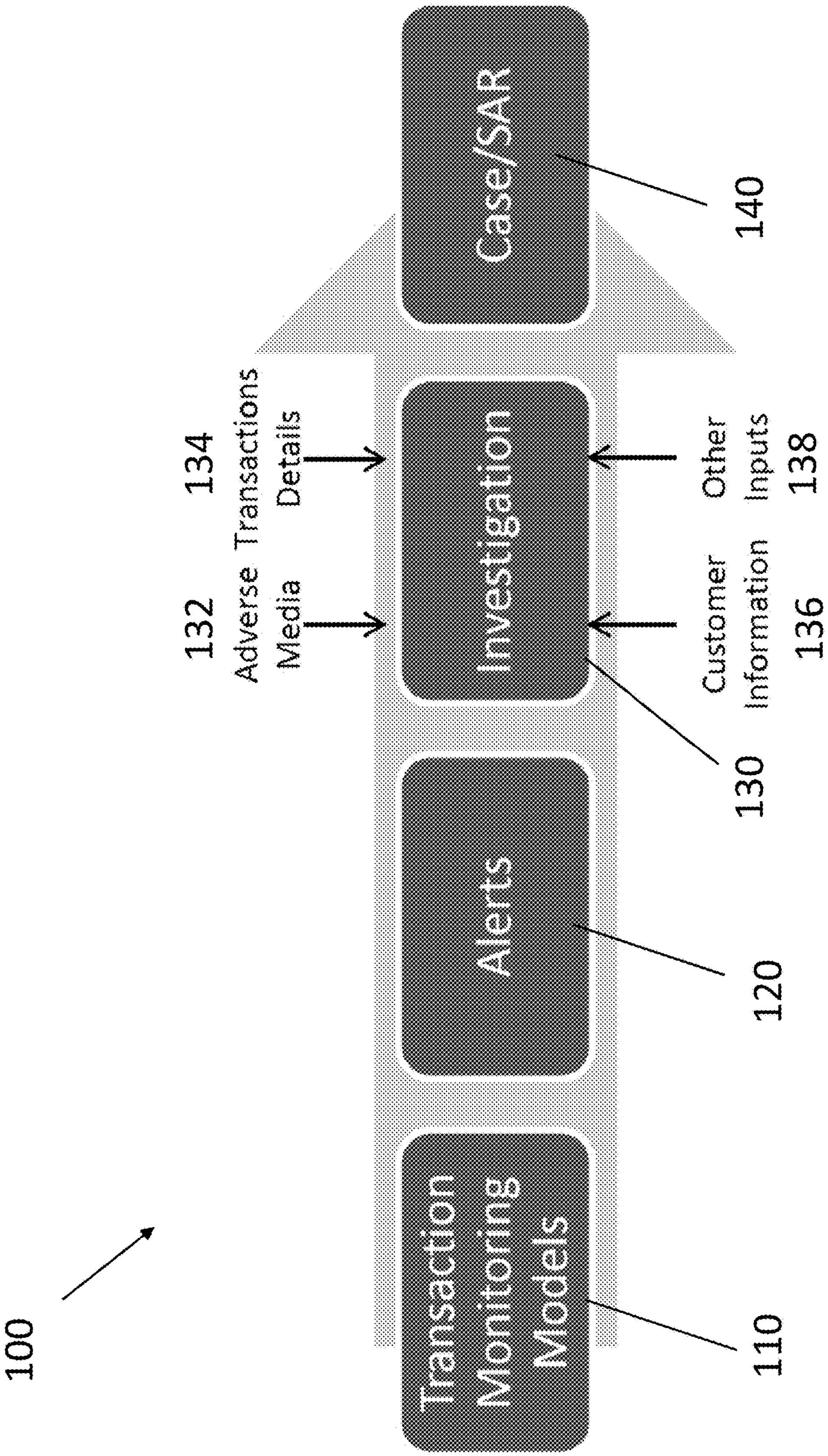
FIG. 1 is a flow chart schematic diagram of component functions of a Transaction Monitoring Program, according to an embodiment.

References will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

With the increase in on-line publishing and rapid growth of information communication technologies, a large number of electronic documents are available on-line and users face difficulty in finding relevant information. An automatic document summarization system generates a summary, e.g., short length text that includes all the important information of the document. As used herein, "document summarization" may refer to a process of automatically creating a compressed version of a given document or set of documents that provides useful information to users. In various embodiments, document summarization is employed to create a compressed version of one or more adverse media items. Document summarization also may be referred to herein as automatic document summarization, text summarization, and automatic text summarization.

Document summaries can be generated through extractive as well as abstractive methods. Abstractive methods are highly complex as they need extensive natural language processing, and the systems and methods of the present disclosure use extractive summarization methods. As used herein, "Natural Language Processing" ("NLP") may refer to applications of computer science, information engineering, and artificial intelligence to extract and classify content from text and image sources. The automatic text summarization system of the disclosure generates a text summary, e.g., a condensed form of the document that contains a few important sentences selected from the document. In various embodiments, the document summarization methodology of the present disclosure seeks to minimize the number of selected sentences included in the text summary while including all the important information of the document.

In an embodiment, important information includes information referring to a selected investigation subject and information pertaining to one or more selected risk factors. As used herein "investigation subject" may refer to a person or organization that is under investigation for one or more risk factors. "Risk factors" may refer to activities, issues, or concerns that present risks to a financial institution or other enterprise, including without limitation compliance risks, legal risks, credit risks, and cybersecurity risks. "Risk factor topic" may refer to a topic or set of topics corresponding to subjects representing risk factors or characteristics of risk factors. Risk factor topics are also herein called risk factor subjects.

In various embodiments, techniques disclosed herein employ single document summarization, in which a summary is generated from a single original document or source text. Using extractive summarization, an extract summary is generated by selecting a limited number of relevant sentences from the original document. In various embodiments, the number of selected sentences is less than one half the number of sentences in the original document, sometimes referred to as the compression rate of the summarization.

In conventional document summarization, document summaries can be either generic or topic-focused. Embodiments described herein generate topic-focused summaries. Topic-focused summarization differs from generic summarization in that given a specified topic description, topic-focused summarization seeks to create from the documents a summary that either answers an information need expressed in the topic or that explains the topic. Specific topic descriptions may include, e.g., a user information query or a set of specific subjects. In various embodiments, selected topics include a selected investigation subject and a set of selected risk factor topics. In various embodiments, document summarization does not require that a selected investigation subject and one or more risk factor topics be included in the same sentence. In an embodiment, embodiments described herein employ unsupervised learning techniques to select specific topics.

In various embodiments, AI techniques for document summarization employ supervised machine learning, which trains a summary generation model. Model training employs a large corpus of training data for selecting important content from the documents. The supervised machine learning technique also includes a large volume of labeled data. In various embodiments, the supervised machine learning incorporates selected risk factor topics as labels or targets for model training.

In an embodiment, automatic text summarization AI techniques include pre-processing of a source text by applying linguistic techniques that include for example removal of stop-words, removal of punctuation marks, and segmentation of sentences.

In various embodiments, document summaries also include risk factor topics that are likely to be relevant to a source text, and the document summarization methodology further includes AI techniques for classifying texts via these risk factor topics. In an embodiment, a topic classifier AI model employs unsupervised machine learning.

In various embodiments, systems and methods described herein employ document summarization in enterprise risk management. Enterprise risk management programs typically seek to monitor risk factors, to assess exposures across enterprise operations, and to take actions to mitigate risk. In various embodiments, document summarization generates topic-focused summaries that feature risk factors, i.e., activities, issues, or concerns that present risks to a financial institution or other enterprise. Sample risk factors include without limitation compliance risks, legal risks, credit risks, and cybersecurity risks.

Financial institutions face various risk factors in their operations. As used herein "Financial Institutions" may refer to entities that provide services as intermediaries of financial markets. Financial institutions are also herein called financial enterprises herein. In various embodiments, financial institutions include depositary institutions, i.e., deposit-taking institutions that accept and manage deposits and make loans, including without limitation banks, building societies, credit unions, trust companies, and mortgage loan companies; contractual institutions, including without limitation insurance companies and pension funds; and investment institutions, including without limitation investment banks, underwriters, and brokerage firms. In an embodiment, financial institution may also refer to other types of enterprise that may be exposed to Risk Factors.

Enterprise risk management programs typically implement investigations of these risk factors as part of financial governance. A major category of risk factors is compliance risks. Financial institutions are required to investigate these various compliance risk factors and submit reports of detected risks, e.g., in Suspicious Activity Reports. As used herein "Suspicious Activity Report," "SAR," or "SARs" may refer to a compliance procedure provided under the Bank Secrecy Act of 1970 for monitoring suspicious activities that would not ordinarily be flagged under other reports. SAR or SARs also may refer to corresponding laws or regulations of other jurisdictions for monitoring suspicious activities.

Common examples of compliance risk factors programs are anti-money laundering and financial crime compliance programs. For example, compliance programs can avoid or mitigate reputational risks to enterprises such as financial institutions. Another major category of risk factors is credit risks. Financial institutions carry out credit risk investigations to assess credit-worthiness of prospective borrowers and to manage credit and liquidity risks. Systems and methods disclosed herein apply AI techniques in enterprise risk management programs such as management of compliance risks and credit risks.

A leading category of compliance risk management is anti-money laundering (AML). As used herein, "Anti-Money Laundering" or "AML" may refer to laws, regulations, or procedures requiring an institution to perform due diligence on potential clients to ensure that it is not aiding in activities for concealing the origins of money obtained illegally. Criminals and terrorists have been resourceful and persistent in their money laundering activities. By some estimates, these activities account for between 2% to 5% of global GDP. Over time, compliance officers and regulators often have discovered that conventional AML programs don't reflect the real money laundering risks. High-risk entities can escape scrutiny, while legitimate accounts and transactions have often been flagged for investigation. Additionally, conventional processes are time-intensive due, e.g., to false positives and inefficient presentation of information. Investigators can spend most of their time in manual data gathering and in laborious review, rather than in productive investigation.

Suspicious Activity Report ("SAR") is a compliance procedure provided under the Bank Secrecy Act of 1970 for monitoring suspicious activities, such as activities that would not ordinarily be flagged under other reports such as currency transaction reports. SARs can cover almost any activity that is out of the ordinary. An activity may be included in the SAR if the activity gives rise to a suspicion that a party such as an account holder or actual or prospective customer is attempting to hide something or make an illegal transaction. SARs are filed by the financial institution that observes suspicious activity in an account. The report is filed with the Financial Crimes Enforcement Network, a division of the U.S. Treasury, which will then investigate the incident and make it available to local law enforcement.

FIG. 1 is a schematic diagram showing various functions of a Transaction Monitoring System 100 included in the operations of a financial institution or other enterprise, according to an embodiment. As used herein, "transaction monitoring" and "transaction monitoring system" may refer to a method or system for monitoring transactions and related investigation subjects. In various embodiments, transaction monitoring refers to a program for monitoring transactions and investigation subjects to detect risk factors and to determine likelihood of risk factors. In various embodiments, transaction monitoring includes investigation of alerts and adverse media items. In an embodiment, transaction monitoring also can include risk management actions based on detected risk factors. Users such as risk management professionals build and maintain transaction monitoring models 110. In various embodiments, transaction monitoring models periodically monitor various transactions of the enterprise, and seek to identify suspicious transactions. In an embodiment, the transaction monitoring models look for suspicious transactions that could be related to money laundering activities. Transaction monitoring program 100 accesses alerts 120, such as periodic or ongoing alert reports that provide users with articles, news stories, web pages, data files, and other electronic content that may relate to suspicious activities of interest, such as money laundering.

As used herein, "alerts" may refer to information services that provide users with articles, news stories, web pages, and other electronic content. In various embodiments, alerts track the Internet for content matching requirements of a financial institution or other enterprise, such as user queries.

Alerts also may refer to the matching content provided by such information services, also referred to herein as alert reports. In various embodiments, alert reports may take the form of standardized data files that contain information about a plurality of articles or media records. In an embodiment, alert reports take the form of data files including a set of links to respective media records. In various embodiments, alert reports include documents pertaining to investigation subjects. In various embodiments, alert reports include adverse media items.

As used herein, "articles," also herein called "media records" or "media items," may refer to media containing information that may be included in investigations. Articles can be obtained from a wide variety of sources, including without limitation 'traditional' news outlets and unstructured sources of news or other information. In various embodiments, articles have a variety of content formats including, without limitation, electronic text documents available on-line and other electronic information obtained under computer control. In various embodiments, media items include "adverse media" or "adverse media items," which may refer to media items containing unfavorable information containing investigation subjects. In various embodiments, the unfavorable information pertains to one or more risk factor.

In various embodiments, alerts track the Internet for content matching user requirements, such as user queries defining specified risk factors such as compliance risks including money laundering and financial crimes. In various embodiment, alerts are configured to provide a series of data feeds on investigation subjects, such as customers of the enterprise or other persons or organizations involved in transactions of the enterprise. In various embodiments, alerts 120 retrieve data from an investigation alerts database, such as a database of public domain information concerning heightened risk individuals and organizations.

Another element of the transaction monitoring program workflow is investigations 130. In an embodiment, after transaction modeling models 110 identify suspicious transactions, one or more investigators of the enterprise review these transactions, as well as related customers or other investigation subjects. As used herein, "investigator" or alternatively "user" may refer to a user of the transaction monitoring system. In an embodiment, an investigator may escalate an alert to an SAR, or may escalate an alert to a "case." As used herein, "case" may refer to other legal procedures for investigating suspicious activities besides an SAR. In various embodiments, investigations employ a number of tools and resources to properly determine legitimacy of an alert. In an embodiment, these resources include Adverse Media searches. In various embodiments, inputs to investigations can include adverse media 132, transaction details 134, customer information 136, and other inputs 138.

In various embodiments, Investigations determine whether to take risk mitigation actions on alerts 120. In the illustrated embodiment, an investigation determines whether to escalate an alert to a case/SAR 140.

Systems and methods of the disclosure incorporate an adverse media dashboard to summarize adverse media items and other input texts. In various embodiments, the adverse media dashboard also categorizes adverse media items and other input texts into a set of selected categories such as risk factor topics including AML, financial crimes, terrorism, legal/reputation, etc. Applicant has observed that document summaries and topic categorization improve productivity of investigations by enabling investigators to quickly establish context of an article without having to go through the whole article, while retaining or improving accuracy such as in deciding what alerts to escalate to cases/SARs.

Figure 2:
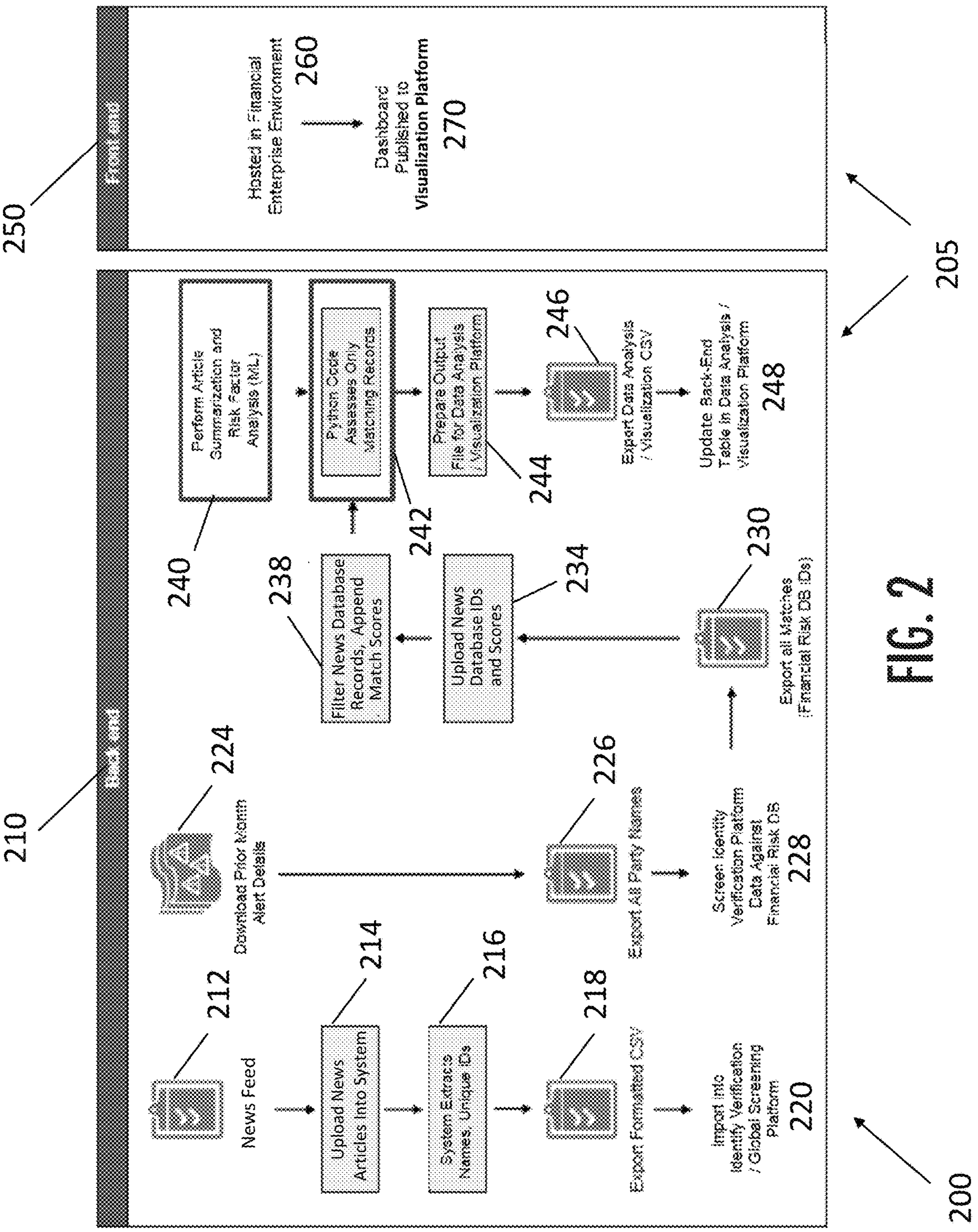
FIG. 2 is a schematic diagram of back-end and front-end data flows for processing risk factor alerts and for generating document summarizations for display at an adverse media dashboard, according to an embodiment.

The adverse media dashboard pipeline 200 of FIG. 2 shows data flows for generating information for display at an adverse media dashboard within a transaction monitoring system 205. The adverse media dashboard pipeline 200 includes data flows in a back end 210 and a front end 250 of the transaction monitoring system 205. Back-end and front-end data flows include stages for processing risk factor alerts, and stages for generating document summarizations for display at the adverse media dashboard.

The transaction monitoring system 205 may be hosted on one or more computers (or servers), and the one or more computers may include or be communicatively coupled to one or more databases including databases of a sponsoring entity and third-party databases. The transaction monitoring system 205 can be executed by a server, one or more server computers, authorized client computing devices, smartphones, desktop computers, laptop computers, tablet computers, PDAs, and other types of processor-controlled devices that receive, process, and/or transmit digital data. The transaction monitoring system 205 can be implemented using a single-processor system including one processor, or a multi-processor system including any number of suitable processors that may be employed to provide for parallel and/or sequential execution of one or more portions of the techniques described herein. The transaction monitoring system 205 performs these operations as a result of central processing unit executing software instructions contained within a computer-readable medium, such as within memory. In one embodiment, the software instructions of the system are read into memory associated with the transaction monitoring system 205 from another memory location, such as from a storage device, or from another computing device via communication interface. In this embodiment, the software instructions contained within memory instruct the transaction monitoring system 205 to perform processes described below. Alternatively, hardwired circuitry may be used in place of, or in combination with, software instructions to implement the processes described herein. Thus, implementations described herein are not limited to any specific combinations of hardware circuitry and software.

In various embodiments, the adverse media dashboard pipeline 200 extracts information from internal databases of the transaction monitoring system 205, and information from external third-party information services. Databases are organized collections of data, stored in non-transitory machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, and network databases. Database management systems include MySQL, PostgreSQL, SQLite, Microsoft SQL Server, Microsoft Access, Oracle, SAP, dBASE, FoxPro, IBM DB2, LibreOffice Base, and FileMaker Pro. Database management systems also include NoSQL databases, i.e., non-relational or distributed databases that encompass various categories: key-value stores, document databases, wide-column databases, and graph databases.

In various embodiments, third-party information services in adverse media dashboard pipeline 200 include a database of public domain information concerning Politically Exposed Persons (PEPs) and heightened risk individuals and organizations. The data is used to identify and manage financial, regulatory and reputational risk. All information used is in the public domain and research analysts profile individuals and entities using open-source research methods. The API is a REST/JSON web service accessible over HTTPS, in which data is delivered using the JSON data transmission standard. In an embodiment, adverse media dashboard pipeline 200 incorporates communications with the database and/or information previously downloaded from the database at various stages of the pipeline. In an embodiment, at stage 212 the pipeline downloads news articles from a news database. In an embodiment, references in FIG. 2 to news database refer to the source of the news feeds. In an example, the news database is a database of news articles concerning Politically Exposed Persons and heightened risk individuals and organizations.

In various embodiments, third-party services in adverse media dashboard pipeline 200 include an integrated regulatory compliance platform that combines matching algorithms for identity verification with access to global screening data. In an embodiment, at stage 220 the system imports a data file of names and unique IDs extracted from downloaded raw data into the compliance platform, e.g., in a CSV format. At stage 228 third-party screening service screens exports Party Names data against the database via the Sanctions setting of the compliance platform. An identity verification function of third-party screening service maintains a list of variants of customer names or names of other investigation subjects, and stores this list of name as aliases. At steps 220, 228 the compliance platform matches its list of customer aliases against customer names identified, which helps match customer names in records of the sponsoring enterprise against Name data.

In various embodiments, third party services in adverse media dashboard pipeline 200 include a financial crime detection software product with a single platform for fraud, compliance, AML and sanctions screening. In an embodiment, at stage 224 the pipeline downloads prior month alert details from this crime detection software product. In an embodiment, party names exported from the downloaded alert details are used in compliance platform matching.

In various embodiments, third-party services in adverse media dashboard pipeline 200 include an analytics and business intelligence platform that provides data analyses using predictive modeling and statistical techniques, and provides data visualization tools. The intelligence platform may include natural language search and AI-powered insights, and interactive dashboards for visualizing data. A reporting function generates web-based reports with customized data visualization. In an embodiment, at stages 244, 246, and 248 a Data Analysis/Visualization Platform processes data output by stage 242, exports data analysis/visualization CSV file, and updates a back-end table in the Data Analysis/Visualization Platform with the exported CSV file.

In a first segment of the adverse media dashboard pipeline 200, at stage 212 the pipeline downloads one or more current news feeds. In an embodiment, the downloaded risk reports include a set of formatted data files. The pipeline uploads 214 the news articles (e.g., raw alert report data files) into the back end system, and extracts 216 names and unique IDs from the alert report data files. In an embodiment, the extracted names and unique ID's included more than 1 million partitions. In an embodiment, pipeline stage 218 exports a CSV file obtained from the extracted data. Stage 220 imports the CSV file into an Identity Verification, Global Screening Platform. In an embodiment, the imported CSV data included more than 1 million partitions.

In a second back-end segment of the adverse media dashboard pipeline 200, at stage 224 the pipeline downloads prior month alert report details, and exports all Party names at 226. At stage 226 the exported Party data is screened against data from stage 220.

In a third back-end segment of the adverse media dashboard pipeline 200, at stage 230 the pipeline exports all matching records, including news database ID's (e.g., World-Check IDs). At stage 234, the back-end system uploads all news database IDs and match scores. In an embodiment, the uploaded match scores are match scores. At stage 238, the pipeline filters the news database records and appends the match scores to these records.

A fourth back-end segment of the adverse media dashboard pipeline 200 generates article summarizations and risk factor categorizations of adverse media items at stage 240. In an embodiment, transaction monitoring system 205 stores these article summarizations and risk factor categorizations in a database of the sponsoring enterprise, from which they can be retrieved on demand. Stage 242 receives filtered news database records with appended match scores from stage 238, and Python code applies this data to assess only matching document summarization records output by stage 240. At stage 244 the pipeline prepares output data for a Data Analysis/Visualization Platform. Stage 246 exports Data Analysis/Visualization CSV file, and stage 248 replaces a back-end table in the Data Analysis/Visualization Platform with the exported CSV file.

In an embodiment employing client-server architecture, transaction monitoring system 205 hosts 260 the Data Analysis/Visualization Platform in communication with user devices 190 without local set-up of Python objects. At the front end 250, the updated Data Analysis/Visualization Platform updated at 248 is published 270 to user devices in an updated adverse media dashboard. In another embodiment, transaction monitoring system 205 transmits the Data Analysis/Visualization Platform for installation on a user devices, creating a virtual environment, and setting up Python objects locally.

Figure 3:
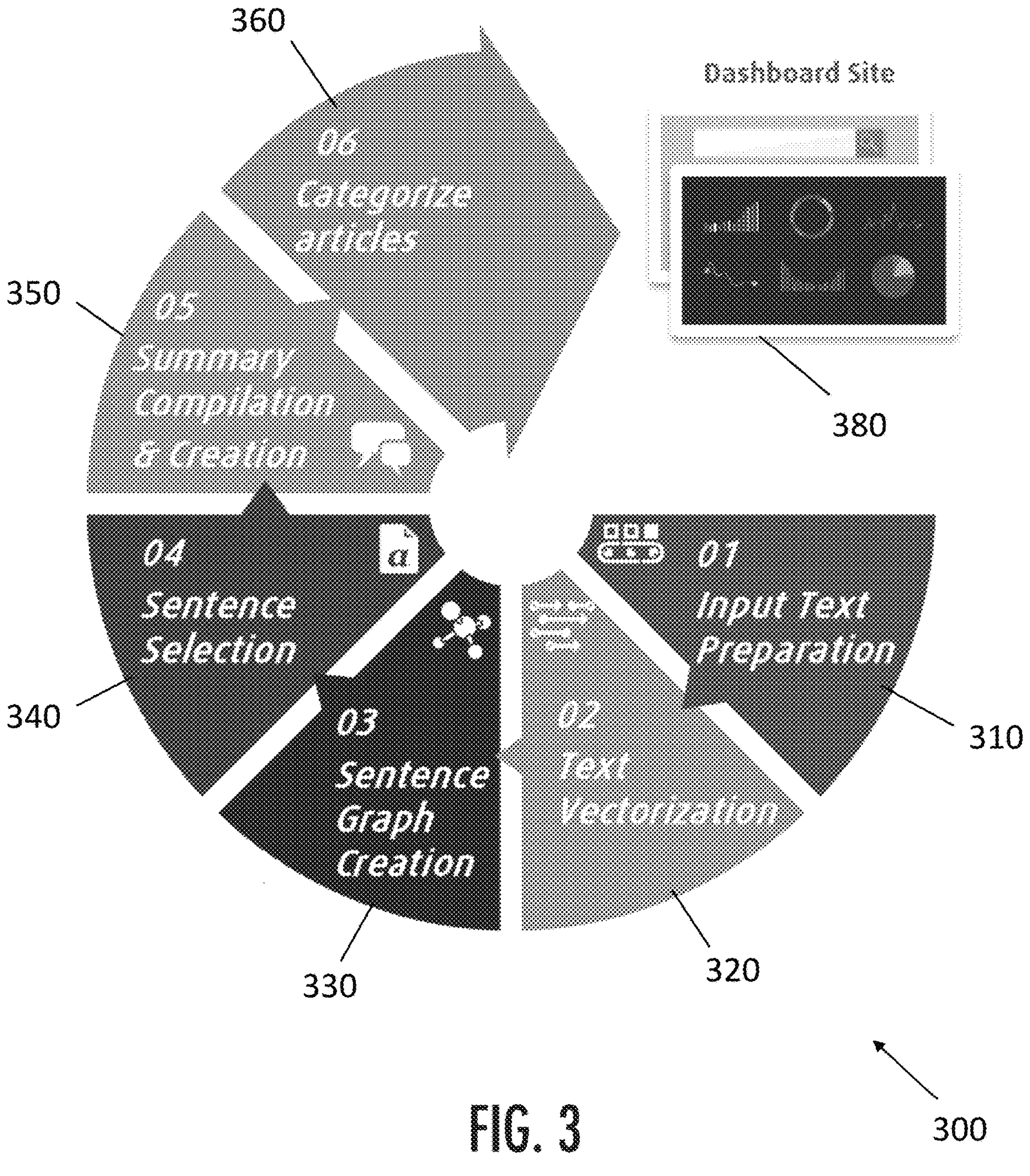
FIG. 3 is a flow diagram of an article summarization methodology, according to an embodiment.

FIG. 3 is a flow diagram of an article summarization methodology 300 for processing an input text file to generate summarized articles and risk factor categorization data for a dashboard site 380. In an embodiment, article summarization methodology 300 is implemented in the adverse media dashboard pipeline 200 at stage 240 to perform article summarization and risk factor analysis on adverse media items.

In an embodiment, article summarization methodology 300 may incorporate spaCy, a software library that employs machine learning for NLP functions. spaCy is an open-source software library for advanced natural language processing published under the MIT license. spaCy is implemented in the Python object-oriented programming language, https://www.python.org/. The library offers statistical neural network models for English and other major languages, as well as tokenization for additional languages. spaCy version 2.0 supports deep learning processes that allow connecting statistical models trained by popular machine learning libraries. spaCy's machine learning library, Thinc, is a lightweight type-checked deep learning library for composing models. spaCy's models make NLP decisions—for example, which part-of-speech tag to assign, or whether a word is a named entity—via predictive machine learning. Model predictions are based on examples the model has seen during training. spaCy model training employs training data including examples of text and labels to be predicted by the model.

spaCy's statistical neural network models implement NLP techniques including, among others, syntax-driven sentence segmentation, dependency parsing, text classification, and named entity recognition. Sentence segmentation, also called sentence boundary identification, decides where sentences begin and end. In an embodiment, sentences are segmented based on training data provided during model training. Labelled dependency parsing extracts a dependency parse of a sentence that represents its grammatical structure and defines the relationships between "head" words (parent nodes) and words that modify those heads (child nodes). spaCy incorporates labelled dependency parsing, which seeks to assign correct parent node index to each child node with a dependency relationship label. spaCy's text classification assigns input text to one or more classes or categories. In an embodiment, input text files are classified according to their subjects. Named entity recognition locates a named entity (i.e., real-world object that can be denoted with a proper name) mentioned in unstructured text and classifies the entity into pre-defined categories such as person names and organization names.

Article summarization methodology 300 includes an initial step 310 of input text file preparation, also herein called pre-processing. At step 310, input text is cleaned, e.g., by removing stop words and punctuation. Input text file preparation also includes segmenting the input text file into sentences. Following input text file preparation 310, text vectorization step 320 converts each sentence into vectors, and processes these sentence vectors to generate a similarity matrix of sentences. In an embodiment, this step uses the spaCy software library for advanced NLP to generate a similarity matrix of sentences via cosine similarity.

Article summarization methodology 300 employs automatic extractive summarization. This technique extracts several sentences from a source text and stacks the sentences to create a summary. Identifying the right sentences for summarization is of utmost importance in an extractive method. In an embodiment, the methodology determines importance scores for sentences based on a given set of risk factors used in topic-based text summarization. In an embodiment, the importance scores are based in part on where the name of the investigation subject appears in the article.

Sentence Graph Creation step 330 creates a graph corresponding to the sentence similarity matrix generated at step 320, then calculates importance scores for each sentence. The importance score represents how much the sentence is contextually related to other sentences. In an embodiment, sentence graph creation 330 employs TextRank, a general purpose, graph based ranking algorithm for NLP. Mihalcea R. and Tarau P., "Textrank: Bringing order into texts." Proceedings of EMNLP 2004 (cd. Lin D and Wu D), pp. 404-411. Association for Computational Linguistics, Barcelona, Spain.

Sentence Selection step 340 selects a limited number of sentences, this limitation determined by the size of the original article (source text file). This step compiles the selected steps in a predetermined order, such as the same order in which the sentences appear in the source text. Step 350 outputs the compiled text as an article summary. Step 360 processes the original input text file of each article to categorize risk factor topics relevant to the article.

Figure 4:
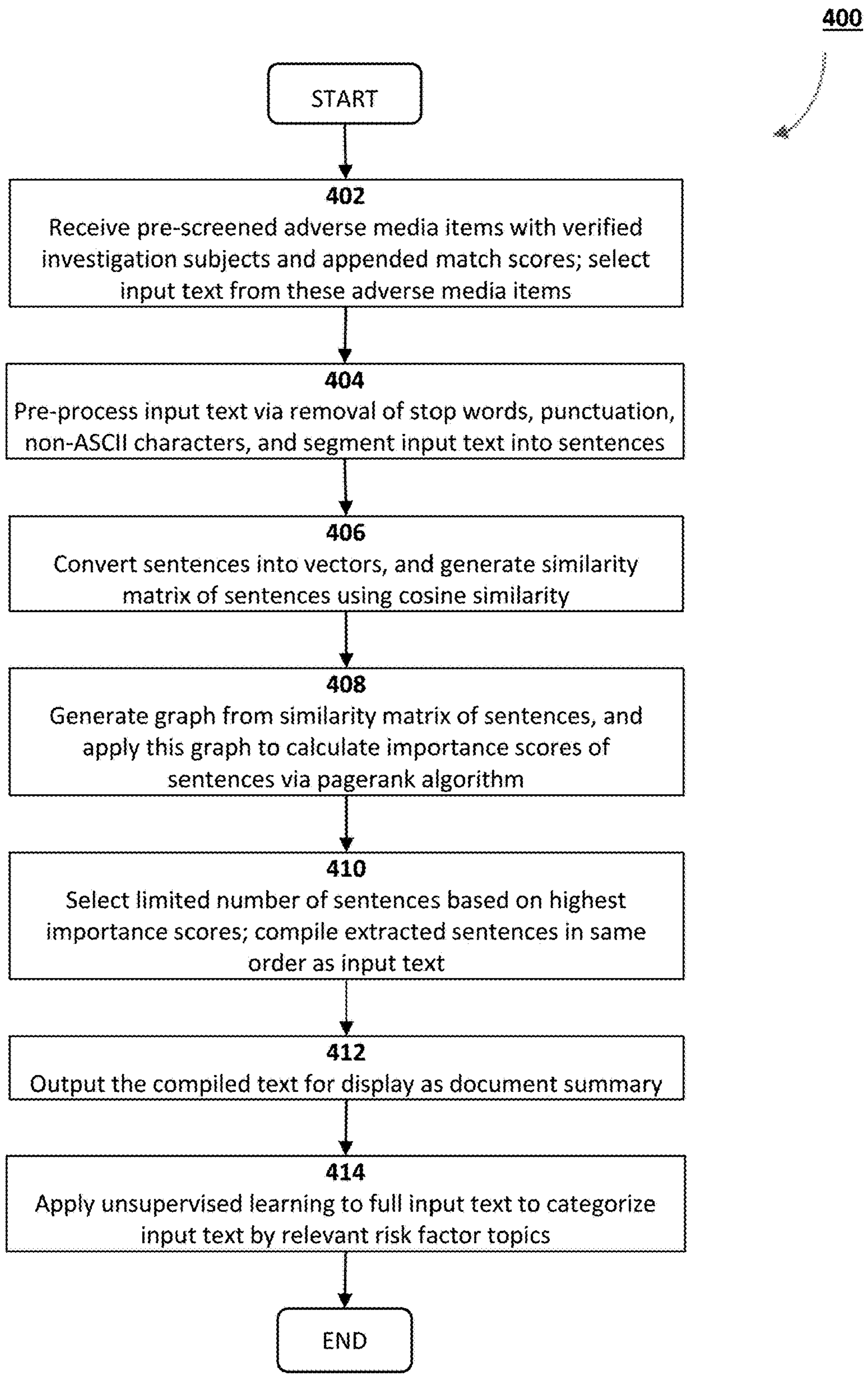
FIG. 4 is a flow chart schematic diagram of a method for preparing document summarization and risk factor categorization for a pre-screened adverse media input text, according to an embodiment.

FIG. 4 shows a flow chart schematic diagram of a method 400 for preparing document summarization and risk factor categorization of an input text file for a pre-screened adverse media item. In an embodiment, document summarization method 400 incorporates the spaCy software library that employs machine learning for NLP functions. Step 402 receives pre-screened adverse media items with verified investigation subjects and appended match scores. In an embodiment, step 402 is implemented via stages 212 through 238 of the adverse media pipeline 200 of FIG. 2. Step 402 selects an input text file from the pre-screened adverse media items for further processing.

Text cleaning step 404, which is an embodiment of the input text file preparation step 310, pre-processes the selected input text file via removal of stop words, punctuation, non-ASCII characters, and segments input text into sentences. In an embodiment, step 404 removes a set of words satisfying a stop word list and removes punctuation from the input text file. In an embodiment, input text preparation removes characters outside the US-ASCII standard. American Standard Code for Information Interchange (ASCII) is a character encoding standard for electronic communication. In an embodiment, input text preparation removes pronouns from the input text file. Input text preparation also includes segmenting the input text into sentences. In an embodiment, sentence segmentation results in a matrix of sentences.

Step 406, which is an embodiment of the Text Vectorization step 320, converts sentences into vectors and generates similarity matrix of sentences using cosine similarity. As implemented in Python, cosine similarity is the normalized dot product between two vectors, i.e., the product of the Euclidean magnitudes of the two vectors and the cosine of the angle between them. Cosine similarity is a metric employed to measure similarity of documents (sentences) irrespective of their size. spaCy effects similarity matching to determining the similarity between two sentences in a matrix of sentences generated at step A110. spaCy similarity matching compares word vectors. Each word has a vector representation, an object built into spaCy that represents a multi-dimensional meaning of each word. In an embodiment, text vectorization step 406 creates a vector representation of each sentence by applying a machine learning word embedding model of spaCy, wherein the model was previously trained with a vocabulary of words and phrases including a plurality of risk factor topics. Step 406 then generates a sentence similarity matrix containing entries corresponding to pairs of respective sentences, wherein each entry of the sentence similarity matrix is generated by computing cosine similarity values of the vector representations of the corresponding pair of sentences.

In an embodiment, spaCy's statistical neural network models implement NLP techniques based on supervised machine learning. Word vectors are learned by contextual embeddings, which are trained on the corpora. Similarity between two sentences is expressed as a value that can range from 0 to 1, wherein 1 indicates that both sentences are the same and 0 indicates no similarity between the sentences. Text preprocessing at step A110 improves the accuracy rate of sentence similarity matching by removing elements of the source text such as stop words and punctuation, thereby streaming the Python code.

In various embodiments, document summarization techniques incorporate ongoing machine learning in a production document summarization model. In an embodiment, the model is continually or periodically retrained based on model performance metrics. In various embodiments, model performance metrics are acquired automatically. In various embodiments, performance metrics are acquired through user (investigator) feedback submitted using the adverse media dashboard.

Step 408, which is an embodiment of the Sentence Graph Creation step 330, generates a graph from the similarity matrix of sentences. In an embodiment, at step 408 the similarity matrix is used to generate a graph. This graph is used to calculate TextRank scores for each sentence. In an embodiment, the graph includes a plurality of nodes or vertices each corresponding one of the sentences, and a plurality of undirected edges connecting each pair of the plurality of nodes. Each of the undirected edges represents the entry of the sentence similarity matrix for the pair of sentences corresponding to the pair of the nodes connected by that edge.

In an embodiment, step 408 applies this graph to calculate importance scores of sentences. The importance score of each sentence represents how much the sentence is related to other sentences. In an embodiment, step 408 employs TextRank, the general purpose, graph based ranking algorithm for NLP that is based on the PageRank algorithm. The graph based upon the sentence matrix is highly connected, with a weight associated with each edge, indicating the strength of the connections established between various sentence pairs in the text. Consequently the TextRank algorithm applies weighted graph-based ranking to assign an importance value to each node or vertex of the graph, and to the sentence represented by that mode. In an illustrative weighted graph-based ranking procedure, TextRank values of all nodes are randomly initialized. The procedure carries out a random walk algorithm on the sentence graph, assigning a TextRank score representing the importance of each node and its corresponding sentence. In an embodiment, the TextRank values assigned to nodes of the graph are calculating using a formula disclosed by Mihalcea and Tarau.

Step 410, which is an embodiment of the Sentence Selection step 340, selects a limited number of sentences based on highest importance scores. In an embodiment, these importance scores represent the final TextRank score computed for each sentence. The sentences with the highest rank are selected for inclusion in the summary.

In an embodiment, step 410, which is an embodiment of the Summary Compilation and Creation step 350, compiles extracted sentences in same order as input text. In an embodiment, the limited number of sentences is based on the size of the original input text. In an embodiment the limited number of sentences is less than half the size of the original input text. Step 412 outputs the compiled text for display as a document summary.

Step 412, which is an embodiment of the Summary Compilation and Creation step 350, outputs the compiled text for display as a document summary.

Step 414, which is an embodiment of the Categorize Articles step 360, applies unsupervised learning to the full input text to support categorize the full input text by relevant risk factor topics. In an embodiment, step 412 categorizes the article using a set of five risk factor topics. In an embodiment, step 414 applies unsupervised learning to categorize articles. In an embodiment, during model training unsupervised learning is applied to a corpus of adverse media items (e.g., articles) in order to identify common themes or risk factor topics in those articles.

Figure 5:
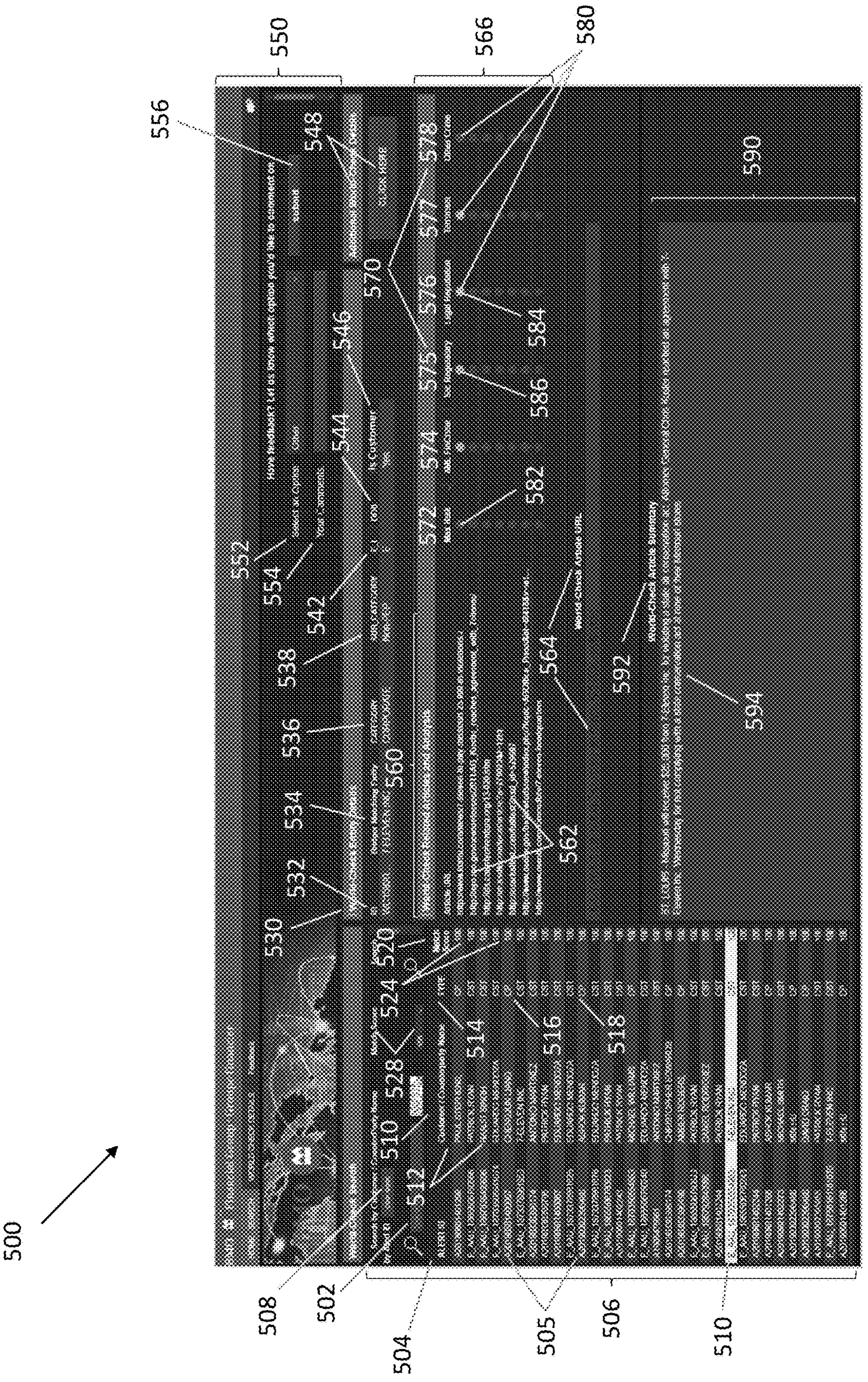
FIG. 5 is a representative view of a user interface showing a dashboard with lists of investigation subjects and adverse media items, displaying a document summary and risk factor categorization data for a selected adverse media item, according to an embodiment.

FIG. 5 is a representative view of a user interface showing an adverse media dashboard 500. Dashboard 500 displays lists of alerts and related investigation subjects and adverse media items. In addition, dashboard 500 displays a document summary and risk factor categorization data for an investigation subject and adverse media item selected by a user. Dashboard 500 facilitates review by investigators of adverse media items and negative news articles.

In an embodiment, dashboard 500 supports various file formats for adverse media items. In an embodiment, dashboard 500 supports PDF links and HTML links to documents accessed online. In an embodiment, linked files are parsed to extract exact article text. In an embodiment, the dashboard includes English-language articles and articles in other languages.

At the left side the dashboard includes a first dashboard region 506 including a table that lists alert records 505. In an embodiment, alert records 505 include data extracted from at least some of the alert report data files downloaded from an investigation alerts database. In an embodiment, alert records 505 include an investigation subject associated with each alert record. Columns 504 of this table include Alert ID 504, Customer/Counterparty name 512, Type 514, and Match Score 520. In an embodiment, the alert records include articles and the Alert ID is the ID. In an embodiment, each row of the table corresponds to a given alert ID. The table can list multiple alerts associated with a given customer/counterparty name. Type column 514 includes a code for the type of customer/counterparty, which may be either CST for a customer or CP for a counterparty. A user can click on a given row of table 506 as shown at 510 to select that alert and display information pertaining to the alert at other sections of the dashboard. For example, control 528 displays a match score for a selected alert.

Graphical user interface elements above the table include a search window 508 used to search for alerts by Alert ID. Search window 502 is used for searching for alerts relating to given Customer/Counterparty by entering customer or counterparty name or Entity ID. In an embodiment, search outputs include a Match Score 520. In an embodiment, after accessing a matching Entity name, corresponding entity details are shown at dashboard section 530. Entity details include ID 532 (Entity ID), Matching Entity 534, Category 536 (e.g., Corporate, natural person), Sub-Category 538 (e.g., politically exposed person (PEP) or non-PEP), E_I 542 (entity, individual), DOB 544 (date of birth), Is Customer (Yes/No) 546. The dashboard is configured to display additional details by clicking on the control 548.

A second dashboard region 560 of dashboard 500 includes a Related Articles and Analysis table that displays a list of media records 562 (e.g., adverse media items and other articles). In an embodiment, media records 562 include a URL of a link associated with each media record. In various embodiments, a user may select a given media record 562 to display additional information concerning that article, such as a document summary 592.

To the right to second dashboard region 560, a third dashboard region 566 includes graphical user interface elements, which corresponding to various risk factor topics. Illustrative risk factor topics 570 shown in third dashboard region 566 include Max Risk 572, AML FinCrime 574, Sec Regulatory 575, Legal/Reputation 576, Terrorism 577, and Other Crime 578. Risk factor topic 574-578 represent five selected risk factor subjects, while Max Risk 572 indicates the likelihood that the categorized adverse media item presents a high level of risk.

Third dashboard region 566 also includes a matrix of graphical user interface elements 580 including a row for each adverse media item listed at 563, and six columns corresponding to the various risk factor topics. Graphical user interface elements 580 are GUI buttons that can display one of several color codes or can be empty. In the illustrated embodiment, GUI button color codes include red, orange, and grey. The graphical user interface elements 580 provide a graphical depiction of one or more attributes of the risk factor topics in the six columns of the matrix. A red button 582 indicates that the respective risk factor topic is highly likely to be relevant to the respective adverse media item. An orange button 584 indicates that the respective risk factor topic is moderately likely to be relevant to the respective adverse media item. A grey button 586 indicates that the respective risk factor topic is unlikely to be relevant to the respective adverse media item. A GUI button may be empty if the respective adverse medium item does not include text in a supported language, or if the system cannot parse the source file to extract article text, among other possibilities. These graphical representations of relevance of risk factor topics can be very helpful in investigating adverse media items. In an example, the red color coding 582 of Max Risk 572 at the first listed adverse media item can prompt submission of that adverse media item in supporting documentation in a SAR, or otherwise escalating the adverse media item.

In an embodiment, automatic document summarization of accessed documents applies techniques disclosed herein to summarize text articles from a lengthy text to a shorter equivalent text, assigns a match score to each article, and categorizes articles into one or more potential risk factor categories. In an embodiment, automatic document summarization supports English language texts. In other embodiments, automatic document summarization supports additional text languages.

In response to user selection of a given article in the list 563 at Related Articles and Analysis section 560, transaction monitoring system 205 retrieves an automatically generated document summary of that article for display by dashboard 500. At a fourth dashboard region 590 at the bottom right portion of the dashboard displays, an Article Summary window 592 displays a document summary 594 that has been automatically generated for a selected adverse media item.

The upper right portion of the dashboard defines a fifth dashboard region 550 that includes a user interface 550 for providing feedback on a selected adverse media item, on an article summary displayed at 590, or on risk factor topic visualizations displayed at 570, 580. The user interface includes a control 552 for selecting among a set of feedback options 556. The user feedback interface also includes comments field 554. In an embodiment, feedback options include identifying article summarizations or scores that should be adjusted, and that can be used in continual retraining of the machine learning NLP model. In an embodiment, feedback options include providing other investigator comments and metrics regarding model performance that can be used in model retraining. In an embodiment, feedback options include risk management actions based on investigations, such as flagging an adverse media item for submission as supporting documentation in a SAR, or otherwise escalating an adverse media item.

Figure 6:
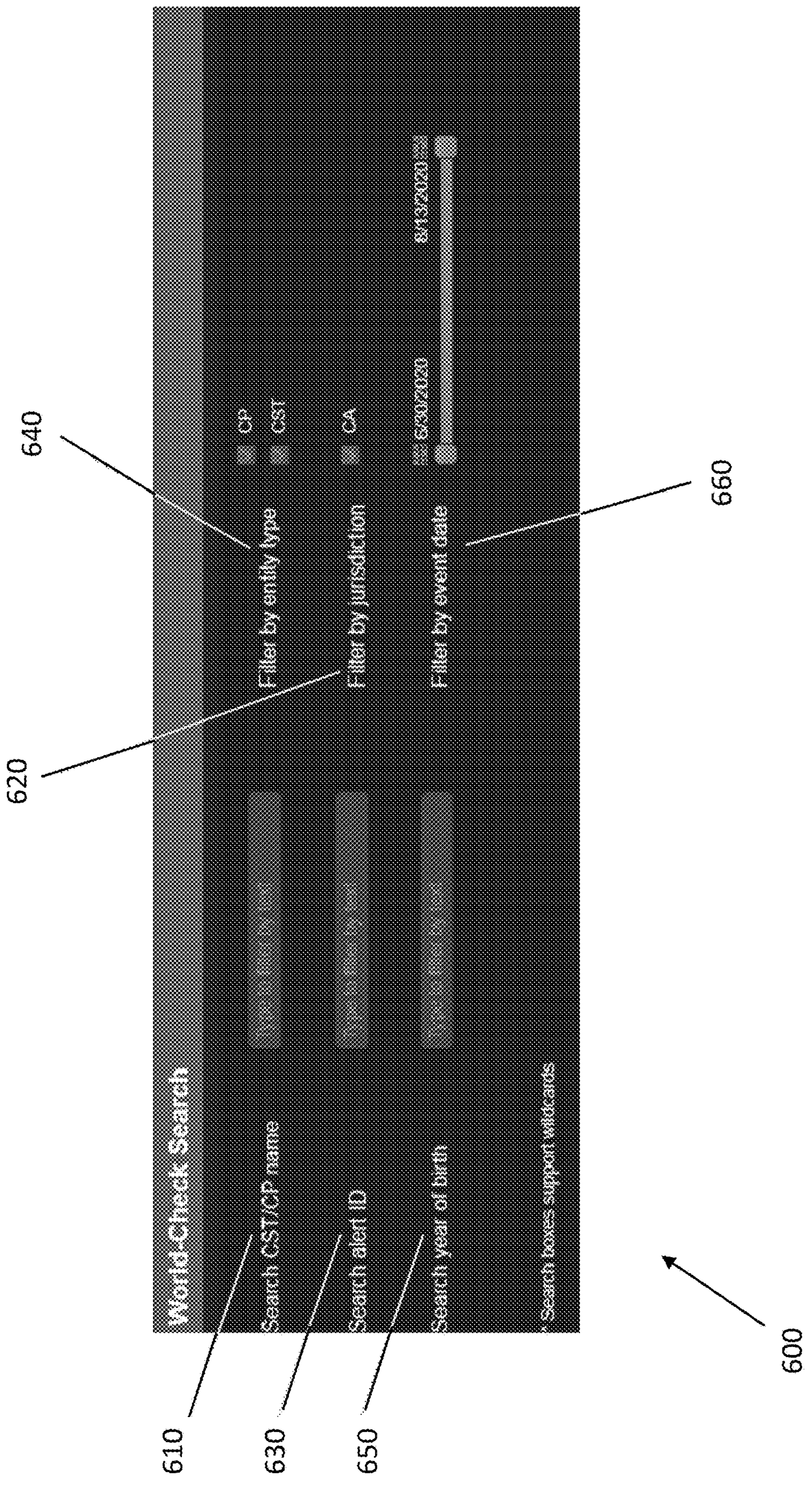
FIG. 6 is a representative view of a user interface showing a search tool for searching for alerts from a database of public domain information concerning Politically Exposed Persons (PEPs) and heightened risk individuals and organizations, according to an embodiment.

FIG. 6 shows a user interface 600 of a search tool for searching for alerts from a database of public domain information concerning Politically Exposed Persons (PEPs) and heightened risk individuals and organizations. User interface 600 permits entry of search parameters 610, 630, 650, and of criteria 620, 640, 560 for filtering search returns. Search box 610 specifies search by name of a customer (CST) or a counter-party (CP), e.g., name of a given individual or organization. Control 620 filters search returns by CST or CP. Search box 630 specifies search by Alert ID. Control 640 filters search returns by jurisdiction. Search box 650 specifies search by year of birth of an individual. Control 660 filters search returns by event date of reported events in areas of interest such as political, financial and criminal events that may indicate risk associated with customers and transactions.

Figure 7:
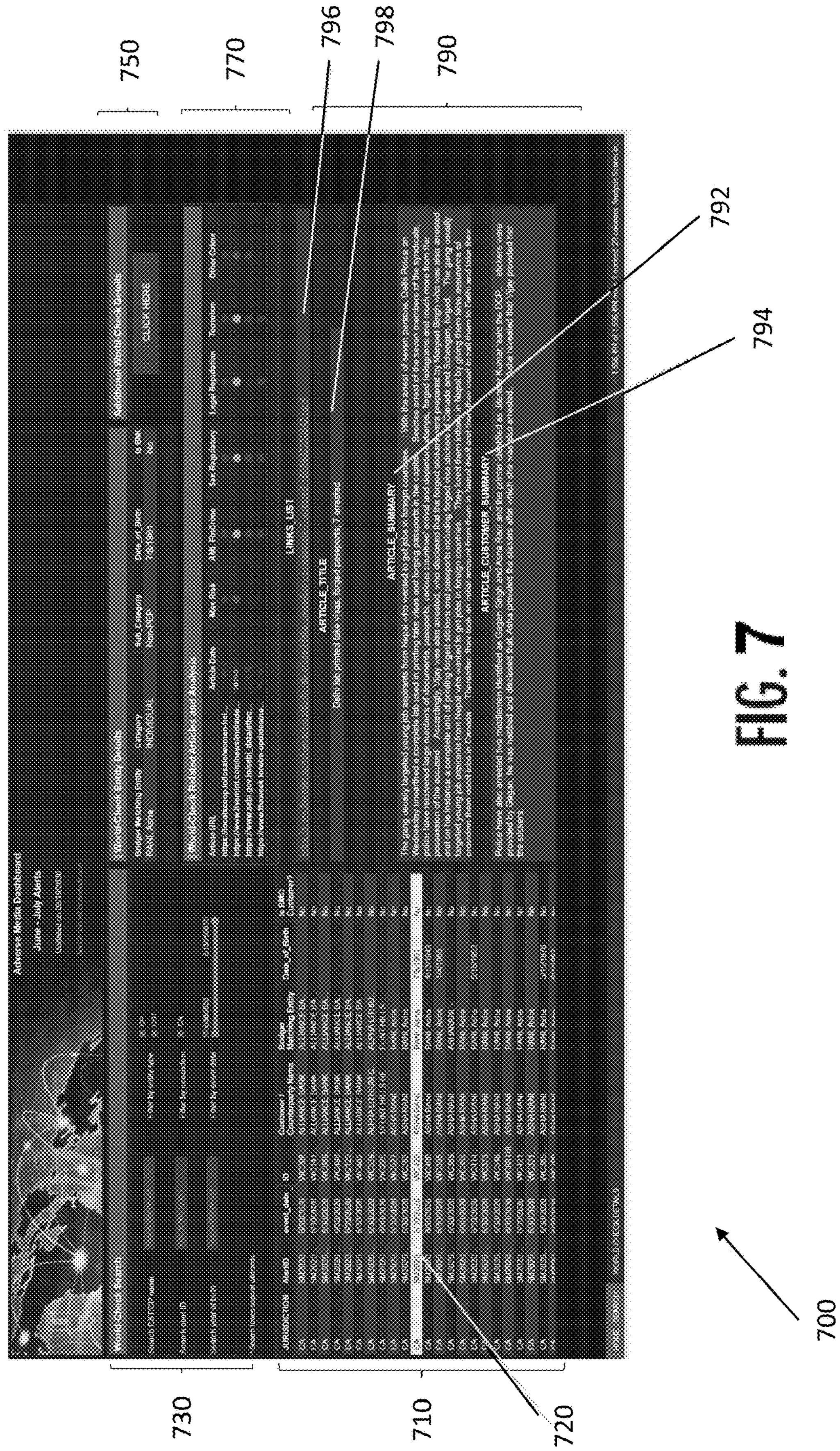
FIG. 7 is a representative view of a user interface showing a dashboard with lists of investigation subjects and adverse media items, displaying a document summary and risk factor categorization data for a selected adverse media item, according to an embodiment.

FIG. 7 is a representative view of a user interface showing a further embodiment of adverse media dashboard 700. Dashboard 700 displays lists of alerts and related investigation subjects and adverse media items. In addition, dashboard 700 displays a document summary and risk factor categorization data for an investigation subject and adverse media item selected by a user. Dashboard 700 facilitates review by investigators of adverse media items and negative news articles. The user interface layout of adverse media dashboard 700 incorporates various user interface components that correspond to components of the adverse media dashboard 500 of FIG. 5, and reference should be had to the description of FIG. 5 for details of these user interface components. The following description notes additional aspects of adverse media dashboard 700.

Like the graphical user interface 500 of FIG. 5, the graphical user interface dashboard 700 includes a first dashboard region, a second dashboard region, a third dashboard region, and a fourth dashboard region. The first dashboard region displays a listing of alert records derived from the output of the transaction monitoring models. The second dashboard region displays a set of links to respective media records of an alert record, generated in response to user selection of that alert record at the first dashboard region. The third dashboard region displays a plurality of graphical formatting elements for one or more of the media records, wherein the graphical formatting elements correspond to a set of selected risk factor topic categories. The fourth dashboard region displays a document summary of a text document included in one of the media records listed at the second dashboard region, generated in response to user selection of that media record via actuation of a link.

At the lower left side the dashboard 700 includes a first dashboard region 710 that displays a listing of alert records derived from the output of the transaction monitoring models. In an embodiment, the alert records include data extracted from at least some of the alert report data files downloaded from an investigation alerts database. In an embodiment, the alert records include an investigation subject associated with each alert record and columns of this table may include fields corresponding to the columns of the listing of alert records in the dashboard of FIG. 5. In an embodiment, each row of the listing corresponds to a given alert ID. A user can click on a given row of table of alert records as shown at 720 to select that alert and display information pertaining to the alert at other sections of the dashboard.

An upper left portion of the dashboard defines a user interface component 730 that includes a user interface used to search for alerts by search parameters such as Alert ID and customer or counterparty name. In an embodiment, dashboard region 730 incorporates a search tool 600 shown in FIG. 6 for searching for alerts from a database of public domain information concerning Politically Exposed Persons (PEPs) and heightened risk individuals and organizations.

An upper right portion of the dashboard defines a user interface component 750 that shows entity details for a given investigation subject. In various embodiments, dashboard component 750 may show entity details after entering a customer or counterparty name at the search tool 730, or after selecting a given alert record 720 in the table of alert records 710. In an embodiment, entity details shown at the left side 754 of dashboard region may include Entity ID, Category (e.g., Corporate, natural person), Sub-Category (e.g., politically exposed person (PEP) or non-PEP), date of birth, and Is Customer (Yes/No). The dashboard is configured to display additional details by clicking on the control 758 at the right side of dashboard region 750.

A section 770 at middle right of dashboard 700 displays a list of media records, and displays graphical user interface elements that corresponding to various risk factor topics. In an embodiment, the section 770 encompasses a second dashboard region and a third dashboard region of dashboard 700. The second dashboard region displays a set of links to respective media records of an alert record, generated in response to user selection of that alert record at the first dashboard region. The third dashboard region displays a plurality of graphical formatting elements for one or more of the media records, wherein the graphical formatting elements correspond to a set of selected risk factor topic categories.

Figure 8:
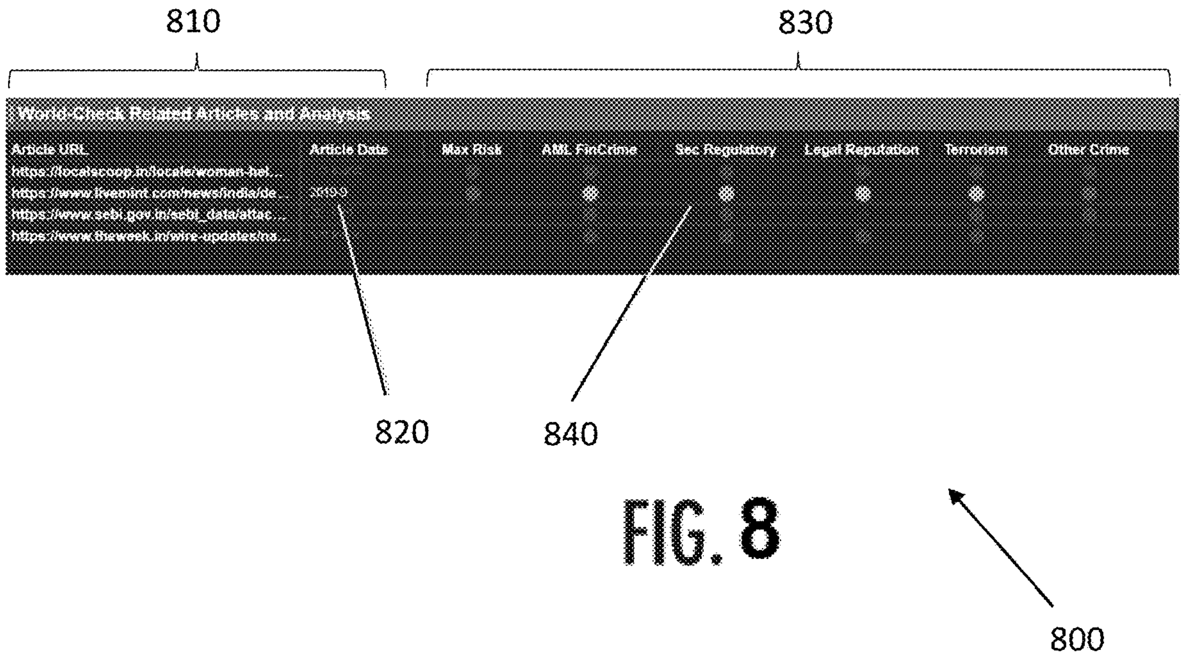
FIG. 8 is a representative view of a user interface of articles and analyses concerning Politically Exposed Persons and heightened risk individuals and organizations, with associated risk factor topics, according to an embodiment.

In an embodiment, the section 770 incorporates the user interface 800 shown in FIG. 8 of articles and analyses downloaded from a database of public domain information concerning Politically Exposed Persons (PEPs) and heightened risk individuals and organizations, and of risk factor topics associated with respective articles and analysis. On the left side, user interface 800 displays a list 810 of media records (second dashboard region). In an embodiment, media records include a URL of a link associated with each media record, and may include an article date 820. In various embodiments, a user may select a given media record to display additional information concerning that article. At the right side, user interface 800 includes graphical user interface elements 830 that corresponding to various risk factor topics (third dashboard region). Illustrative risk factor topics may include topics shown in user interface 500 as discussed above, and may include a column for Max Risk indicating the likelihood that the categorized adverse media item presents a high level of risk. User interface 800 also includes a matrix 840 of graphical user interface elements including a row for each adverse medium item listed at 810, and six columns corresponding to the various risk factor topics.

A fourth dashboard region 790 at the bottom right portion of the dashboard 700 displays a document summary of a text document included in one of the media records listed at the second dashboard region, generated in response to user selection of that media record via actuation of a link. In an embodiment, transaction monitoring system 205 generates a document summary and other information concerning that article for display by dashboard 700 in response to user selection of a given media record in the Related Articles and Analysis table 810 (FIG. 8). Displayed information also includes an Article Customer Summary 794 with information in the article about the investigation subject (customer or counter-party). In an embodiment, Document Summary 792 and Article Customer Summary 794 are both generated using the Article Summarization method 300 of FIG. 3. Other information displayed at dashboard region 790 includes Links List 796 listing the corresponding link (e.g., URL) from a source alert, and Article Title 798.

Foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage, or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

generating, by a computer, a sentence similarity matrix for a plurality of sentences of a text file, the sentence similarity matrix comprising a plurality of entries corresponding to pairs of respective sentences of the plurality of sentences;

creating, by the computer, a graph based upon the sentence similarity matrix, the graph comprising a plurality of nodes corresponding to respective sentences of the plurality of sentences and a plurality of edges connecting each pair of the plurality of nodes;

calculating, by the computer, an importance score of each sentence of the plurality of sentences by applying a weighted graph-based ranking protocol to the graph based upon the sentence similarity matrix to calculate an importance score for each node of the graph and its corresponding sentence;

selecting, by the computer, a subset of the plurality of sentences having highest importance scores;

compiling, by the computer, the subset of sentences in a predetermined order; and outputting, by the computer for display by a display device, a text summary comprising the compiled sentences in the predetermined order.

2. The method of claim 1, further comprising:

generating, by the computer, a representation of each sentence of the plurality of sentences by applying a natural language processing machine learning model previously trained with a listing of words and phrases including a plurality of risk factor topics.

3. The method of claim 2, wherein the natural language processing machine learning model is a machine learning word embedding model.

4. The method of claim 3, wherein the machine learning word embedding model previously trained with the listing of words and phrases including the plurality of risk factor topics is continually retrained based on performance metrics for the text summaries outputted.

5. The method of claim 4, further comprising:

updating, by the computer, the listing of words and phrases during continual retraining of the machine learning word embedding model.

6. The method of claim 4, wherein the performance metrics for the text summaries are automatically generated metrics.

7. The method of claim 1, further comprising:

generating, by the computer, a vector representation of each sentence of the plurality of sentences, and generating each entry of the sentence similarity matrix by computing cosine similarity values of the vector representations of the corresponding pair of respective sentences.

8. The method of claim 7, wherein the creating the vector representation of each sentence and of the generating the sentence similarity matrix of the plurality of sentences implement a spaCy software library for natural language processing functions.

9. The method of claim 1, further comprising:

pre-processing, by the computer, the text file by removing a set of words satisfying a stop word list.

10. The method of claim 1, further comprising:

pre-processing, by the computer, the text file by removing punctuation and non-ASCII characters.

11. The method of claim 1, further comprising:

categorizing, by the computer, the text file into one of more of a set of risk factors topics, wherein the set of risk factor topics were previously generated by applying an unsupervised machine learning model to a corpus of electronic text documents.

12. The method of claim 1, wherein the subset of the plurality of sentences having the highest importance scores are less than half a size of the text file.

13. The method of claim 1, wherein the selecting step compiles the selected sentences in the same order as these sentences appear in the text file.

14. A non-transitory computer-readable medium comprising a set of instructions, that when executed, cause the processor to:

generate a sentence similarity matrix for a plurality of sentences of a text file, the sentence similarity matrix comprising a plurality of entries corresponding to pairs of respective sentences of the plurality of sentences;

create a graph based upon the sentence similarity matrix, the graph comprising a plurality of nodes corresponding to respective sentences of the plurality of sentences and a plurality of edges connecting each pair of the plurality of nodes;

calculate an importance score of each sentence of the plurality of sentences by applying a weighted graph-based ranking protocol to the graph based upon the sentence similarity matrix to calculate an importance score for each node of the graph and its corresponding sentence;

select a subset of the plurality of sentences having highest importance scores;

compile the subset of sentences in a predetermined order; and output, for display by a display device, a text summary comprising the compiled sentences in the predetermined order.

15. The non-transitory computer-readable medium of claim 14, wherein the instruction further cause the processor to generate a representation of each sentence of the plurality of sentences by applying a natural language processing machine learning model previously trained with a listing of words and phrases including a plurality of risk factor topics.

16. The non-transitory computer-readable medium of claim 15, wherein the natural language processing machine learning model is a machine learning word embedding model.

17. The non-transitory computer-readable medium of claim 16, wherein the machine learning word embedding model previously trained with the listing of words and phrases including the plurality of risk factor topics is continually retrained based on performance metrics for the text summaries outputted.

18. The non-transitory computer-readable medium of claim 17, wherein the instruction further cause the processor to update the listing of words and phrases during continual retraining of the machine learning word embedding model.

19. The non-transitory computer-readable medium of claim 18, wherein the performance metrics for the text summaries are automatically generated metrics.

20. The non-transitory computer-readable medium of claim 14, wherein the instruction further cause the processor to:

generate a vector representation of each sentence of the plurality of sentences, and generate for each entry of the sentence similarity matrix by computing cosine similarity values of the vector representations of the corresponding pair of respective sentences.

* * * * *